(12) United States Patent
Gerold et al.

(10) Patent No.: US 8,412,179 B2
(45) Date of Patent: Apr. 2, 2013

(54) METHOD OF CONFIGURING POWER TOOL ELECTRONICS IN A HAND-HELD POWER TOOL

(75) Inventors: Uwe Gerold, Lindau (DE); Joachim Keck, Eschen (DE); Norbert Welte, Klaus (AT)

(73) Assignee: Hilti Aktiengesellschaft, Schaan (LI)

( * ) Notice: Subject to any disclaimer, the term of this patent is extended or adjusted under 35 U.S.C. 154(b) by 484 days.

(21) Appl. No.: 12/384,379

(22) Filed: Apr. 2, 2009

(65) Prior Publication Data

US 2009/0254203 A1 Oct. 8, 2009

(30) Foreign Application Priority Data

Apr. 3, 2008 (DE) .......................... 10 2008 000 980

(51) Int. Cl.
*H04W 24/00* (2009.01)
(52) U.S. Cl. ..................... 455/423; 455/435.1; 455/458; 455/518; 318/139; 318/114
(58) Field of Classification Search ............... 455/426.1, 455/41.1, 41.2, 437, 438, 39, 423, 434.1; 219/130.01, 125.1, 130.21, 132, 137 R
See application file for complete search history.

(56) References Cited

U.S. PATENT DOCUMENTS

| | | | |
|---|---|---|---|
| 7,638,958 B2 * | 12/2009 | Philipp et al. ................. | 318/139 |
| 2002/0033267 A1 * | 3/2002 | Schweizer et al. ................ | 173/2 |
| 2005/0197115 A1 | 9/2005 | Clark | |
| 2008/0207267 A1 * | 8/2008 | Gose ............................ | 455/557 |

* cited by examiner

*Primary Examiner* — Shawki Ismail
*Assistant Examiner* — Christopher Lo
(74) *Attorney, Agent, or Firm* — Abelman, Frayne & Schwab

(57) ABSTRACT

A method of configuring power tool electronics in a hand-held power tool (10) having sensor means (20) for acquiring measurement data, a control unit (50) for processing measurement data and for controlling power tool functions, and a data transmission unit (30), includes transmitting data between the data transmission unit (30) and an evaluation location (62) by means of a mobile wireless network, with the power tool electronics being awakened from a quiescent mode (70) and activated at a time stored as a time parameter in a control program, retrieving a configuration file provided by the evaluation location (62) by the data transmission unit (30) via the mobile wireless network, and checking the response received from the mobile wireless network to determine whether or not it contains a new configuration file. If a configuration file was received, the parameters contained in the configuration file are implemented (77) in the control program for the power tool electronics. The power tool electronics is then returned to the quiescent mode (70) again.

7 Claims, 4 Drawing Sheets

METHOD OF CONFIGURING POWER TOOL ELECTRONICS IN A HAND-HELD POWER TOOL

BACKGROUND OF THE INVENTION

1. Field of the Invention

The present invention is directed to a method of configuring a data transmission unit in a hand-held power tool including sensors for acquiring measurement data, a control unit for processing the measurement data and for controlling power tool functions, and a data transmission unit.

2. Description of the Prior Art

Hand-held power tools can be formed, e.g., as fastener driving power tools which are operated electrically or with solid, gaseous, or liquid fuels or also with compressed air. Hand-held power tools of this kind can also be formed as rotary or at least partially percussive hand-held power tools such as, e.g., hammer drills or chisel power tools. Other examples of such power tools include drilling machines, drill hammers, demolition hammers, screw driving power tools, grinding saws, circular saws, chain saws, and saber saws. The data transmission unit is arranged either in the power tool itself or in a receptacle of the power tool, e.g., a tool case.

In modern hand-held power tools, it is desirable to monitor and track power tool functioning and operating states so that, for example, any malfunctions or operating errors which may occur are detected as early as possible—ideally before they happen—and countermeasures can be taken.

U.S. Pat. No. 6,123,241 discloses a hand-held power tool which is formed as a fastener setting power tool and which has a monitoring system which lets the user know when upkeep or repairs must be carried out on the fastener driving power tool. To this end, the monitoring system has a microprocessor that receives input data from different sensors. For example, the fuel pressure is monitored by a pressure sensor. Data can be downloaded from the monitoring system to an external personal computer via a corresponding interface or data transmission unit. Data input signals can also be uploaded from a personal computer or user interface.

It is disadvantageous that the power tool only permits a manually controlled transmission of data when the power tool is located in the immediate vicinity of a personal computer.

SUMMARY OF THE INVENTION

It is the object of the present invention to overcome the disadvantages mentioned above.

This and other objects of the present invention, which will become apparent hereinafter, are achieved by the inventive method of configuring power tool electronics in a hand-held power tool includes sensing means for acquiring measurement data, a control unit for processing measurement data and for controlling power tool functions, and a data transmission unit, with data transmission being carried out between the data transmission unit and an evaluation location by means of a mobile wireless network. The method includes the following steps:

in a first step, at least the control unit and the data transmission unit of the power tool electronics are awakened from a quiescent mode and activated at a time stored as a time parameter in a control program, in a subsequent, second step, the data transmission unit enters into a wireless digital data communication with the mobile wireless network and, via the mobile wireless network, retrieves a configuration file provided by an evaluation location, in a subsequent, third step, the data transmission unit receives via the mobile wireless network a response which can contain a new configuration file, in a subsequent, fourth step, the data transmission unit and/or the control unit check(s) whether or not a configuration file was received and, if a configuration file was received, implements parameters contained in the configuration file in the control program for the data transmission unit, and, in a further subsequent step, the data transmission unit and the control unit are returned to the quiescent mode again.

As a result of this method, data can be sent from the power tool to an evaluation location virtually from any point on earth regardless of location, and the data transmission unit is controlled by means of the configuration file via the evaluation location.

In an advantageous manner, the data transmission between the evaluation location and the data transmission unit is carried out indirectly by means of SMS (Short Message Service) so as to ensure a simple and reliable data transmission which does not depend on reception-readiness of the respective partner location because the SMS can be stored on a server of the mobile wireless network until it is retrieved. A plurality of SMS's can be linked together to transmit larger amounts of data.

It is also advantageous when the data transmission between the evaluation location and the data transmission unit is carried out directly via a connection established between the data transmission unit and the evaluation location by the mobile wireless network. As an alternative to data transmission by means of SMS, direct data traffic can take place via a mobile wireless connection between the evaluation location and the data transmission unit. As one result of the direct data traffic, larger amounts of data can be transmitted within a shorter period of time and, further, it is ensured that the data are not only transmitted but also received. This type of data transmission is also more up-to-date.

In a fifth step taking place between the fourth step and the further step, the data transmission unit carries out a data transmission at least of measurement data from the control unit to the evaluation location via the mobile wireless network. The communication between the data transmission unit and the evaluation location is therefore bidirectional so that an existing connection, in addition to transmitting the configuration file from the evaluation location to the data transmission unit of the power tool, can also be used simultaneously to transmit data from the power tool to the evaluation location.

It is further advantageous when, in addition to the control parameters, control programs and/or control program parts can be transmitted from the evaluation location to the data transmission unit with the configuration file so that it is possible to adapt and/or upgrade the control program in a simple manner.

Further, it is advantageous when a position determining device for global positioning is provided in addition to the data transmission unit, wherein the position data determined by the position determining device are transmitted by the data transmission unit along with the data transmission to the evaluation location. As a result of this step, the data to be sent by the data transmission unit is supplemented by a position indicator for the current location of the power tool, which is particularly advantageous for preventing theft. Further, certain data such as, e.g., ambient temperature data, can be related to the position and geography of the area in which the power tool is used.

The novel features of the present invention which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

DETAILED DESCRIPTION OF THE PREFERRED EMBODIMENT

Figure 1:
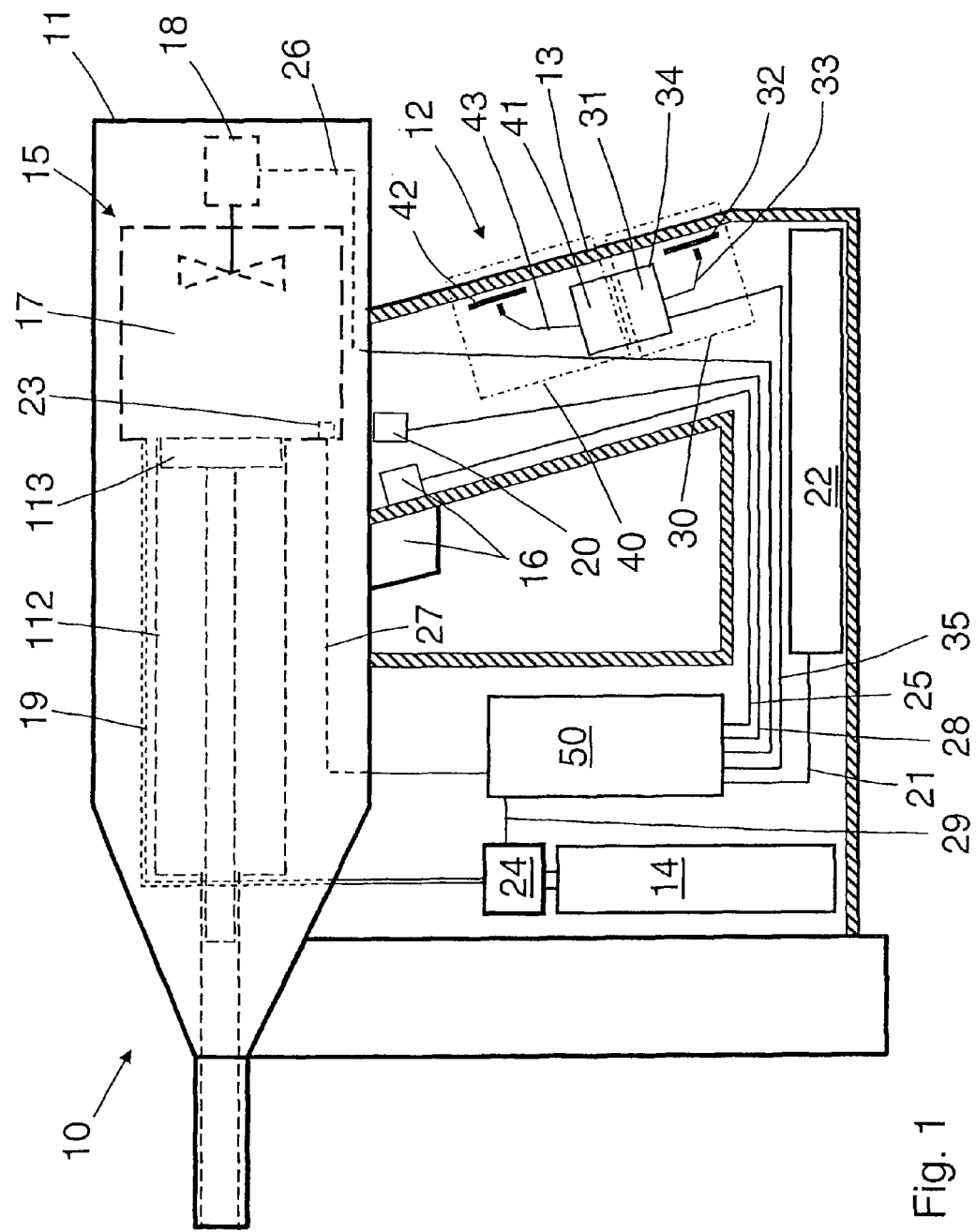
FIG. 1 a partially cross-sectional, side view of a hand-held power tool according to the invention which is formed as a fastener driving power tool.
Figure 2:
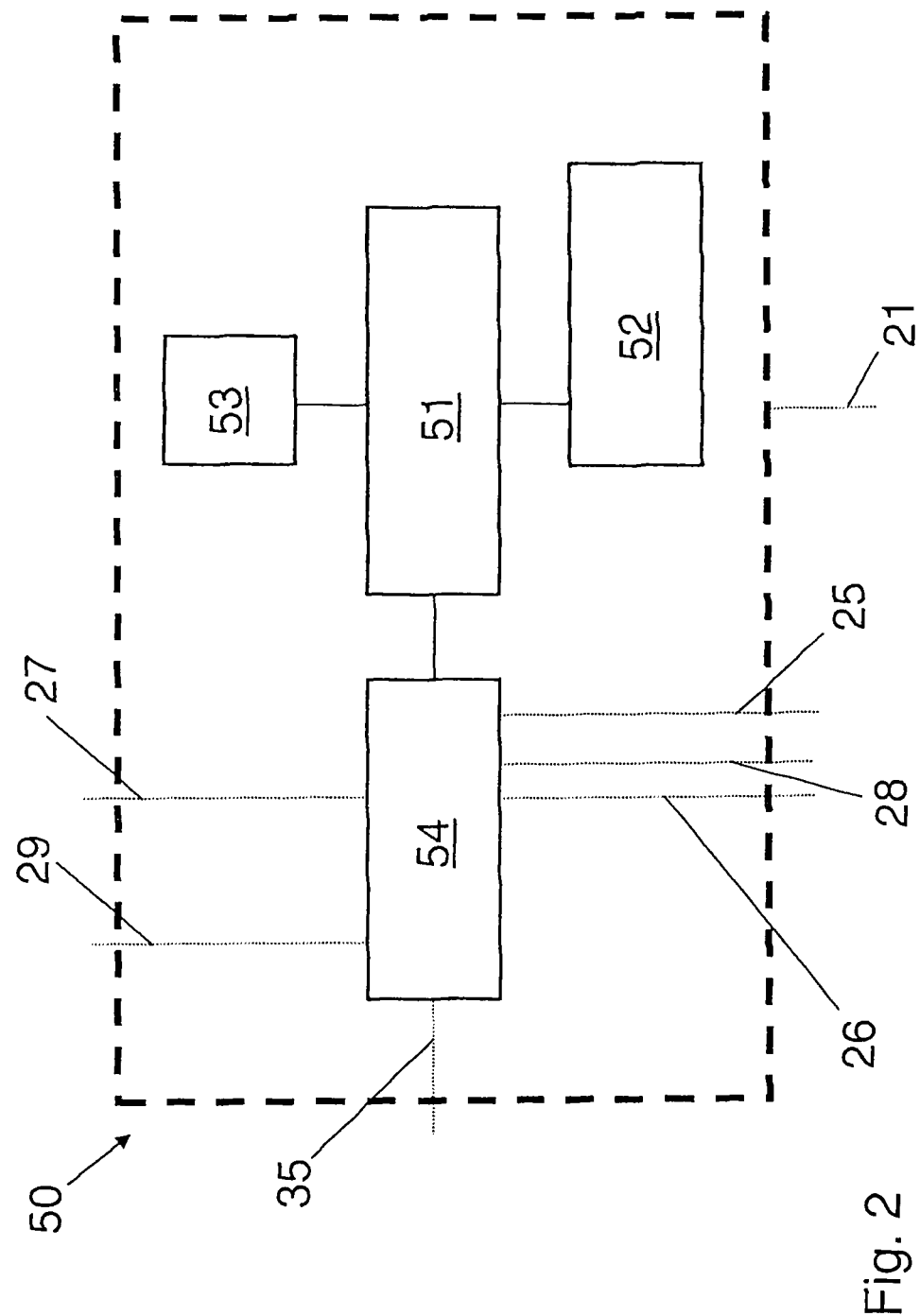
FIG. 2 a schematic view of the control unit of the hand-held power tool according to FIG. 1.

FIGS. 1 and 2 show a hand-held power tool 10 according to the invention in the form of a combustion-powered fastener setting power tool. The power tool 10 has a housing, designated generally by 11, which is formed of one or more parts and in which a drive 15 is arranged. A fastening element such as a nail, bolt, etc. can be driven into a workpiece by means of the drive 15. The fastening elements can be stored, for example, in a magazine at the power tool 10.

The drive includes a combustion chamber 17 and a guide cylinder 112 in which a setting piston 1 13 is arranged so as to be axially displaceable. As can further be seen from FIG. 1, a trigger switch 16 is arranged at a handle area 12 of the power tool 10 by which can actuate a firing power tool 23, e.g., a spark plug, in the combustion chamber 17 when the power tool 10 has been pressed against a workpiece. In addition to the trigger switch 16 mentioned above, additional switches such as, e.g., contact pressing switches, combustion chamber switches or magazine switches can also be provided.

The power tool 10 which is formed in the present embodiment as a fastener setting power tool can be operated with a combustion gas or with a vaporizable liquid fuel which is provided in a fuel reservoir 14, e.g., a fuel canister, shown in FIG. 1. A fuel line 19 leads from the fuel reservoir 14 to the combustion chamber 17. A metering power tool 24, by which the amount of fuel needed for a respective setting process can be metered, is arranged intermediately in the fuel line 19.

A ventilator, which is arranged in the combustion chamber 17 and can be driven by a ventilator motor 18, serves to generate a turbulent flow regime of an oxidant/fuel mixture in the closed combustion chamber 17 and to flush out the open combustion chamber 17 with fresh air after a completed setting process.

An electrical energy source 22 in the form of at least one battery supplies the electrical consumers of the power tool 10, e.g., the firing power tool 23 and the ventilator motor 18, with electrical energy. The battery or batteries can be arranged exchangeably at the power tool 10.

Further, at least one sensor 20, e.g., a temperature sensor for monitoring the power tool temperature or ambient temperature, a pressure sensor for the fuel pressure, a pressure sensor for the atmospheric pressure, an acceleration sensor, a position sensor, a proximity sensor (e.g., for detecting the position of a fastener or tool), a Hall sensor (e.g., for measuring the speed of the setting piston), a humidity sensor, a vibration detector, a CCD receiver, or a microphone, is provided at the power tool 10. Rotation meters or torque meters, for example, could also be provided as a sensor 20, particularly in rotary power tools.

A control unit which is designated in its entirety by 50 and is shown in FIGS. 1 and 2 is provided to control and monitor the power tool functions of the power tool 10. The control unit 50 is connected to the electrical power source 22 by a first electrical line 21. Further, for the purpose of controlling and monitoring power tool functions, the control unit 50 is connected to the trigger switch 16 by a second electrical line 25, to the ventilator motor 18 by a third electrical line 26, to the firing power tool 23 by a fourth electrical line 27, to the at least one sensing power tool 20 by a fifth electrical line 28, to the metering power tool 24 by a sixth electrical line 29, and to a constructional unit by a seventh electrical line 35. This constructional unit which comprises a data transmission unit 30 for wireless, network-supported digital remote data transmission and a position determining device 40 for global positioning will be described more fully in the following.

The power tool electronics of the power tool 10 include the control unit 50, the data transmission unit 30, the position determining device 40, and the sensing means 20.

Figure 3:
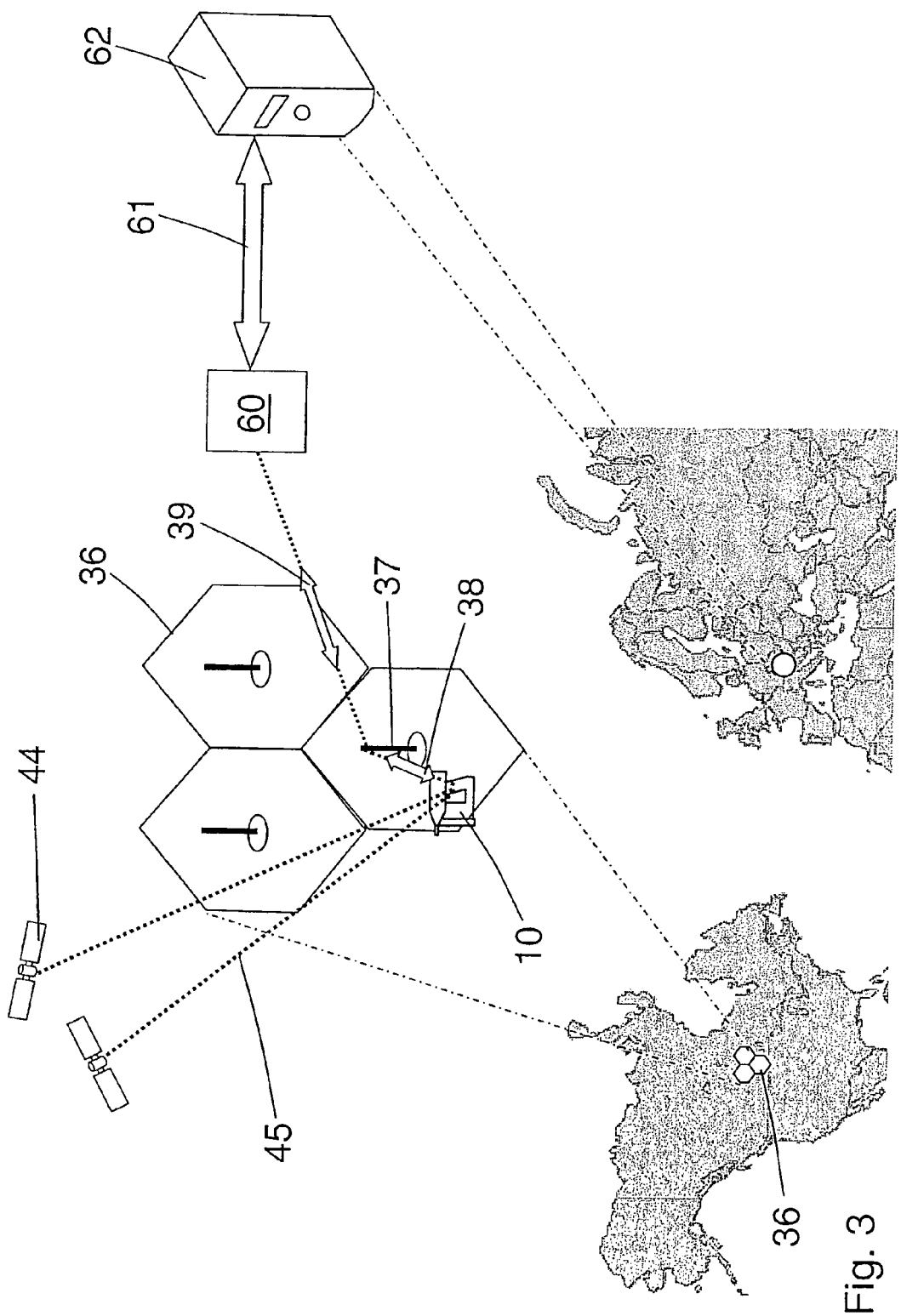
FIG. 3 an operational diagram.

The data transmission unit 30 has a wireless transmitting and receiving unit 31 formed, e.g., as a GSM module, and a radio antenna 32 which is connected to the latter by an eighth electrical line 33. By GSM is meant a global system for mobile communications as used, e.g., in commercial mobile telephones. Measurement data and power tool data (e.g., operating state data) of the power tool 10 can be sent to a preferably central evaluation location 62 (represented by a personal computer in FIG. 3) by the data transmission unit 30 as will be described more fully in the following.

The position determining device 40 has a GPS module 41 and an antenna 42 connected to the latter by a ninth electrical line 43. By GPS is meant a global positioning system such as is used in commercial navigating power tools. The location of the hand-held power tool 10 can be determined by satellite using the position determining device 40 and can be sent to a evaluation location 62 along with the data transmitted from the power tool 10 via the data transmission unit 30.

The GSM module 31 and the GPS module 41 are combined to form a GPS-GSM unit 34 which is arranged at a distance from the drive of the power tool 10 in a handle area 12 of the housing 11. The radio antenna 32 and the antenna 42 are arranged in the immediate vicinity of a housing wall 13 in the handle area 12 so as to ensure good reception.

The control unit 50 has at least one microprocessor 51 which communicates with a preferably nonvolatile data and program storage 52. At least one control program and power tool control parameters for the power tool 10 are stored in the data and program storage 52, and measurement data from the sensing means and power tool data are stored therein during operation of the power tool 10. If necessary, the stored measurement data and power tool data can be linked to time data originating from a real-time clock 53 connected to the microprocessor 51. Further, the control unit 50 is connected by at least one interface 54 to the other electrical components and switches of the power tool 10 and to the GPS-GSM unit 34 as was already described above.

During the operation of the power tool 10, as was already mentioned, the control unit 50 acquires power tool data (e.g., identification data, setting cadence, setting rate, time stamp, power tool temperature and/or ambient temperature, fill level of a fuel reservoir, charge state of a power source (e.g., a battery), fuel metering amount, battery load voltage, battery open-circuit voltage, type of fuel reservoir, function data of a metering power tool, trigger and/or switch actuation, undervoltage cutoffs, error logs, malfunctions) from the power tool 10 and measurement data from the sensing means 20 and, if appropriate, links these data to time data originating from the real-time clock 53. Based on a program running in the control unit 50, the GPS-GSM unit 34 is activated at a predefined time (e.g., daily at 0:00 hours, local time) preferably when the power tool is not in operation. The microprocessor 51 and, therefore, the control unit 50 are awakened from sleep mode by suitable triggering means (software or hardware). As can be seen from FIG. 3, the GPS module 41 then initially receives the coordinates (dotted line 45) representing the instantaneous geographical position of the power tool 10 and the UTC time (coordinated universal time) from satellite 44 via the associated antenna 42. These position data and the UTC time are conveyed from the GPS module 41 of the GPS-GSM unit 34 by line 35 to the control unit 50, where they are put together with measurement data and power tool data which are read out from the data and program storage to form a data packet which is now sent to the GSM module 31 of the GPS-GSM unit 34 via line 35. These data are sent (arrow 38 in FIG. 3) from the GSM module 31, e.g., in the form of at least one SMS (Short Message Service), via the antenna 32 into the GSM network or mobile wireless network (indicated in FIG. 3 by the honeycombs 36 of the wireless network). The message is then received by at least one network antenna 37 of the mobile wireless network and sent within the mobile wireless network (arrow 39 in FIG. 3). The data are sent from the mobile wireless network to the Internet (reference number 60) and are sent within the Internet to a personal computer of the evaluation location 62. Power tool control parameters, changes in the operating program, or new programs can also be sent from the evaluation location 62 to the control unit of the power tool 10 via the mobile wireless network on a reversed communications path. Alternatively, a direct data transmission can also be carried out between the power tool 10 and the evaluation location by a mobile radio connection by means of the mobile wireless network.

Figure 4:
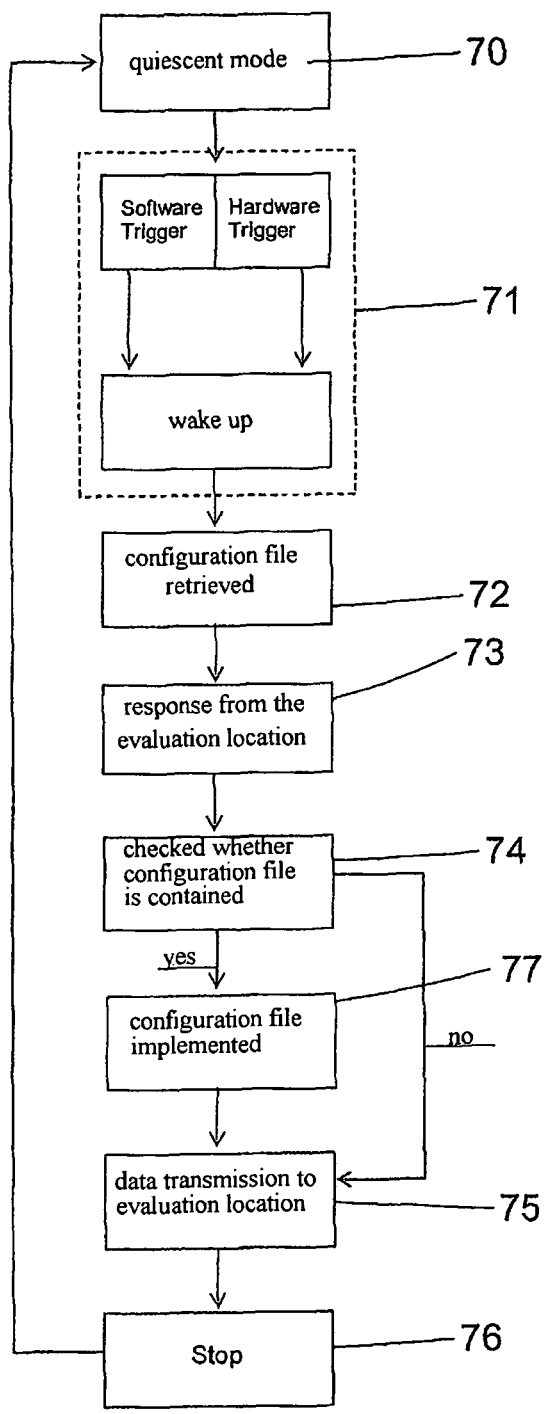
FIG. 4 a flowchart showing the sequence of the method according to the invention.

A method for the (remote-controlled) configuration of the power tool electronics will be described below with reference to FIG. 4. In a first step 71, at least the control unit 50 and the data transmission unit 30 of the power tool electronics are awakened from a quiescent mode 70 and activated (software trigger in FIG. 4) at a time which is stored as a time parameter in a control program. Alternatively, awakening can also be carried out by a hardware trigger. For this purpose, a push-button switch, for example, can be provided which sends a signal to the control unit 50 when actuated.

In a subsequent, second step 72, the data transmission unit 30 enters into a wireless digital data communication with the mobile wireless network and, via the mobile wireless network, retrieves a configuration file provided by the evaluation location 62.

In a subsequent, third step 73, the data transmission unit 30 receives a response via the mobile wireless network which can contain a new configuration file.

In a subsequent, fourth step 74, the data transmission unit 30 and/or the control unit 50 checks whether or not a configuration file was received. In case a configuration file was received, the parameters contained in the configuration file, e.g., the time parameters for awakening the control unit and the data transmission unit 30, are implemented as shown with reference numeral 77 in the control program for the power tool electronics.

In a fifth step 75, the data transmission unit 30 carries out a transmission of at least measurement data from the control unit 50 to the evaluation location 62 by means of the mobile wireless network.

In another step 76, the data transmission unit 30 and the control unit 50 are returned to the quiescent mode 70 again.

As was already described above, the data transmission between the evaluation location 62 and the data transmission unit 30 can be carried out indirectly by SMS or directly via a connection established by the mobile wireless network between the data transmission unit 30 and the evaluation location 62.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A method of configuring power tool electronics in a hand-held power tool (10) including sensor means (20) for acquiring measurement data, a control unit (50) for processing measurement data and for controlling power tool functions, and a data transmission unit (30), with data transmission being carried out between the data transmission unit (30) and an evaluation location (62) by means of a mobile wireless network, wherein
  in a first step (71), at least the control unit (50) and the data transmission unit (30) of the power tool electronics are awakened from a quiescent mode (70) and activated at a time stored as a time parameter in a control program,
  in a subsequent, second step (72), the data transmission unit (30) enters into a wireless digital data communication with a mobile wireless network and, via the mobile wireless network, retrieves a configuration file provided by the evaluation location (62),
  in a subsequent, third step (73), the data transmission unit (30) receives via the mobile wireless network a response which can contain a new configuration file,
  in a subsequent, fourth step (74), at least one of the data transmission unit (30) and the control unit (50) check(s) whether or not a configuration file was received and, if a configuration file was received, implements (77) parameters contained in the configuration file in the control program for the power tool electronics,
  and, in a further subsequent step (76), the data transmission unit (30) and the control unit (50) are returned to the quiescent mode (70) again.

2. The method according to claim 1, wherein the mobile wireless network is a mobile commercial telephone network.

3. The method according to claim 2, wherein the data transmission between the evaluation location (62) and the data transmission unit (30) is carried out indirectly by means of SMS, of the mobile commercial telephone network.

4. The method according to claim 2, wherein the data transmission between the evaluation location (62) and the data transmission unit (30) is carried out directly via a connection established between the data transmission unit (30) and the evaluation location (62) by the mobile commercial telephone network.

5. The method according to claim 2, wherein in a fifth step (75) taking place between the fourth step (74) and the further step (76), the data transmission unit (30) carries out a data transmission at least of measurement data from the control unit (50) to the evaluation location (62) via the mobile commercial telephone network.

6. The method according to claim 1, wherein at least one of control programs and control program parts are transmitted, in addition to the parameters, from the evaluation location (62) to the data transmission unit (30) with the configuration file.

7. A method according to claim 1, wherein a position determining device (40) for global positioning is provided in addition to the data transmission unit (30), wherein the position data determined by the position determining device (40) are transmitted by the data transmission unit (30) along with the data transmission to the evaluation location (62).

* * * * *